(12) United States Patent
Okanda

(10) Patent No.: US 7,462,093 B2
(45) Date of Patent: Dec. 9, 2008

(54) WORKPIECE SUPPORT METHOD AND WORKPIECE SUPPORT DEVICE

(75) Inventor: Satoshi Okanda, Tokyo (JP)

(73) Assignee: OKS Co., Ltd., Tokyo (JP)

( * ) Notice: Subject to any disclaimer, the term of this patent is extended or adjusted under 35 U.S.C. 154(b) by 118 days.

(21) Appl. No.: 10/990,791

(22) Filed: Nov. 17, 2004

(65) Prior Publication Data

US 2006/0105688 A1    May 18, 2006

(51) Int. Cl.
*B24B 1/00* (2006.01)
(52) U.S. Cl. .......................... 451/28; 451/408
(58) Field of Classification Search ............... 451/406, 451/408, 381, 365, 364, 28, 49, 51, 55
See application file for complete search history.

(56) References Cited

U.S. PATENT DOCUMENTS

| | | | | | |
|---|---|---|---|---|---|
| 952,193 | A | * | 3/1910 | Hanson | ...................... 451/408 |
| 2,286,620 | A | * | 6/1942 | Hollengreen | ................. 451/408 |
| 3,330,074 | A | * | 7/1967 | Stuckey | ....................... 451/246 |
| 4,438,599 | A | * | 3/1984 | Kamman et al. | ............. 451/408 |
| 5,494,269 | A | * | 2/1996 | McCalmont | ................. 269/224 |
| 5,527,210 | A | * | 6/1996 | Sharer | ......................... 451/408 |

* cited by examiner

*Primary Examiner*—Robert Rose
(74) *Attorney, Agent, or Firm*—Galgano & Associates PLLC

(57) ABSTRACT

There is provided a workpiece support device for use in machining a workpiece including: a securing support unit; and a following support unit. The securing support unit has a securing abutment member releasably positioned and secured at a desired position, and the securing abutment member abuts against the workpiece at a portion near a portion to be machined to prevent said portion to be machined from moving against the secured securing abutment member. The following support unit has a following abutment member, and the following abutment member abuts against the workpiece at a portion near the portion to be machined on the same side as the securing abutment member, is movable following a movement of the workpiece, and applies a pressure to the workpiece during the movement.

26 Claims, 4 Drawing Sheets

WORKPIECE SUPPORT METHOD AND WORKPIECE SUPPORT DEVICE

BACKGROUND OF THE INVENTION

1. Field of the Invention

The present invention relates to restraining so-called chatter vibrations of a workpiece during machining, and more specifically, to a workpiece support method and a workpiece support device suitable for restraining chatter of a workpiece during machining.

2. Description of the Related Art

In machining such as cutting or grinding of a workpiece, a force applied from a tool to the workpiece sometimes causes so-called chatter of the workpiece. The chatter reduces accuracy of a machining size of the workpiece and increases roughness of a surface machined of the workpiece, and also sometimes makes machining itself difficult.

A workpiece having a simple shape can be easily secured or clamped onto a table of a machine tool, and the workpiece can be secured at a portion near a portion to be machined thereof if required and firmly secured so as to restrain chatter.

A workpiece having a complicated shape, however, cannot be always secured at a portion near a portion to be machined thereof. In this case, getting down a machining speed can restrain chatter to a certain extent, but decreases machining efficiency. Thus, there is a need for some measures to restrain chatter in order to keep high machining efficiency.

FIG. 1 shows an example of a conventional method for restraining chatter. This example shows a case of grinding an upper surface of one side of a thin box-shaped workpiece with an open upper side.

In FIG. 1, a workpiece W is made of metal and has the box shape with the open upper side, and a case is shown of, for example, grinding the upper surface S of one L of vertical walls by a tool T mounted to an unshown machine tool. The workpiece W is secured at a bottom wall B thereof to a table 1 of the machine tool by means of a main clamp 2 shown in a simplified manner. Reference numeral 3 denotes a workpiece support, which is secured onto the table 1. A shaft 4 of the workpiece support protrudes from a casing 5 and is secured, with a tip of the shaft 4 abutting against the vertical wall L of the workpiece W, at a portion near a portion to be machined of the workpiece W. Now, the support 3 will be simply described with reference to FIG. 2.

The casing 5 of the support 3 includes a substantially cylindrical casing body 6 having one open end and the other closed end and a lid 7 that closes the open end, and has a space 8 formed therein. Holes are coaxially drilled in a rear wall 6a of the casing body 6 and the lid 7, and the shaft 4 is provided movably in an axial direction through these holes. In the space 8, a collet 9 is placed around the shaft 4. The collet 9 abuts at both ends thereof against the rear wall 6a of the casing body 6 and the lid 7, and is not axially movable. An outer diameter of the collet 9 gradually increases toward the right in FIG. 2. Reference numeral 9a denotes a seat.

A cylindrical piston 10 is placed outside the collet 9 so as to surround the collet 9, and an inner diameter of the piston 10 gradually increases toward the right in FIG. 2 so as to be parallel to an outer periphery of the collet 9. The piston 10 has a flange 11 whose outer periphery comes into contact with an inner periphery of the housing body 6. Reference numeral 12 denotes a spring that urges the piston 10 to the left in FIG. 2. The housing body 6 has a hydraulic port 13, and a pressure fluid is supplied from a supply source P through the port 13 and acts on a left surface of the flange 11 of the piston 10 in the space 8 to move the piston 10 to the right in FIG. 2. When the piston 10 moves to the right, the piston 10 narrows the collet 9 to fasten the shaft 4 and secure the shaft 4 in that position.

When no hydraulic pressure acts, the piston 10 moves in the opposite direction, that is, to the left by the action of the spring 12 to loosen the collet 9 and release the shaft 4. Because the collet 9 does not fasten the shaft 4, the shaft can freely move in an axial direction. In FIG. 1, the workpiece W is secured by the main clamp 2, and the support 3 is also clamped and secured by an unshown appropriate clamp. Then, the shaft 4 is urged by an unshown spring to the left in FIG. 2, and the tip of the shaft 4 abuts against a side surface of the vertical wall L of the workpiece W. When a hydraulic pressure is supplied to the support 3 in this state, the piston 10 moves to the right in FIG. 2, and the collet 9 is narrowed to fasten the shaft 4, prevent the shaft 4 from moving in the axial direction, and secure the shaft 4 in that position.

In such a state where the tip of the shaft 4 of the support 3 abuts against the vertical wall L at a position near a portion C to be machined on the upper surface S of the workpiece W, the tool T is rotated for machining. At this time, the portion C being machined of the workpiece W tries to vibrate in directions shown by a double-headed arrow A in FIG. 2. It is intended to restrain the vibration by causing the shaft 4 to abut against the vertical wall L.

In the conventional restraining method, the shaft 4 is secured. Thus, when the workpiece W tries to vibrate from an initial position shown in FIG. 2 to the right of the double-headed arrow A under the action of the tool T, the shaft 4 prevents the movement of the workpiece W, and the tip of the shaft 4 keeps in contact with a portion near the portion C being machined of the workpiece W. Thus, the restraining method has an effect of restraining the vibration of the workpiece within a right-hand range. When the workpiece W vibrates to the left of the double-headed arrow A, however, the work piece W is separated from the tip of the shaft 4 because the shaft 4 is secured at the shown position, and the vibration cannot be restrained. Thus, the conventional method cannot sufficiently restrain so-called chatter vibrations, and has a problem in machining accuracy of a workpiece.

Vibrations of a workpiece that occur during machining by a tool are complicated, and primary order vibrations of relatively large amplitude of 5 micron to 10 micron to higher order vibrations of extremely small amplitude are superposed. The inventor of the invention has found that the higher vibrations of small amplitude among these vibrations have a large influence on finishing accuracy in machining a workpiece, and are significantly restrained by keeping a support member in contact with the workpiece with a contact pressure.

SUMMARY OF THE INVENTION

The invention is achieved in view of the above findings, and has an object to provide a workpiece support method and a workpiece support device in which during machining a workpiece, a support member moves following a movement of a portion being machined of the workpiece and keeps in contact with the portion near the portion being machined of the workpiece with a contact pressure to restrain higher vibrations to significantly restrain chatter vibrations and obtain satisfactory machining accuracy.

In order to achieve the above described object, the invention provides a workpiece support device for use in machining a workpiece, including: a securing support unit; and a following support unit, wherein the securing support unit has a securing abutment member releasably positioned and secured at a desired position, the securing abutment member abutting against the workpiece at a portion near a portion being machined to prevent the portion being machined from moving against the secured securing abutment member, and the following support unit has a following abutment member adapted to abut against the workpiece at a portion near the portion being machined on the same side as the securing abutment member, and be movable following a movement of the portion being machined of the workpiece.

In an embodiment, the support device further includes an abutment unit, and the securing abutment member and the following abutment member do not directly abut against the workpiece but abut against the workpiece at a portion near the portion to be machined via the abutment unit. The abutment unit includes an oscillation lever oscillably supported at one end and a support pin provided at the other end of the oscillation lever, the securing abutment member and the following abutment member abut against the oscillation lever, and the support pin abuts against the workpiece at the portion near the portion to be machined.

In order to achieve the above described object, the present invention also provides a workpiece support method for restraining chatter vibrations of a workpiece in machining the workpiece. The method includes the steps of: causing a following abutment member to abut against the workpiece at a portion near a portion to be machined on one side in vibration directions of chatter vibrations, exerting a preload on the workpiece; causing a securing abutment member to abut against the workpiece at a portion near the portion to be machined on the same side as the following abutment member, and releasably securing the securing abutment member at a securing position; and causing the following abutment member to follow a movement of the portion being machined of the workpiece during machining the workpiece. The following abutment member keeps in contact with the workpiece at the portion near the portion being machined with a contact pressure during machining the workpiece.

In an embodiment, the securing abutment member and the following abutment member abut against an oscillation lever oscillably supported at one end and having at the other end a support pin that abuts against the workpiece at a portion near the portion to be machined, and the oscillation lever oscillates during machining the workpiece to keep the support pin in contact with the workpiece at the portion near the portion being machined.

DETAILED DESCRIPTION OF THE PREFERRED EMBODIMENTS

Now, an embodiment of the invention will be described. The scope of the invention is, however, not limited to the below described embodiment.

Figure 1:
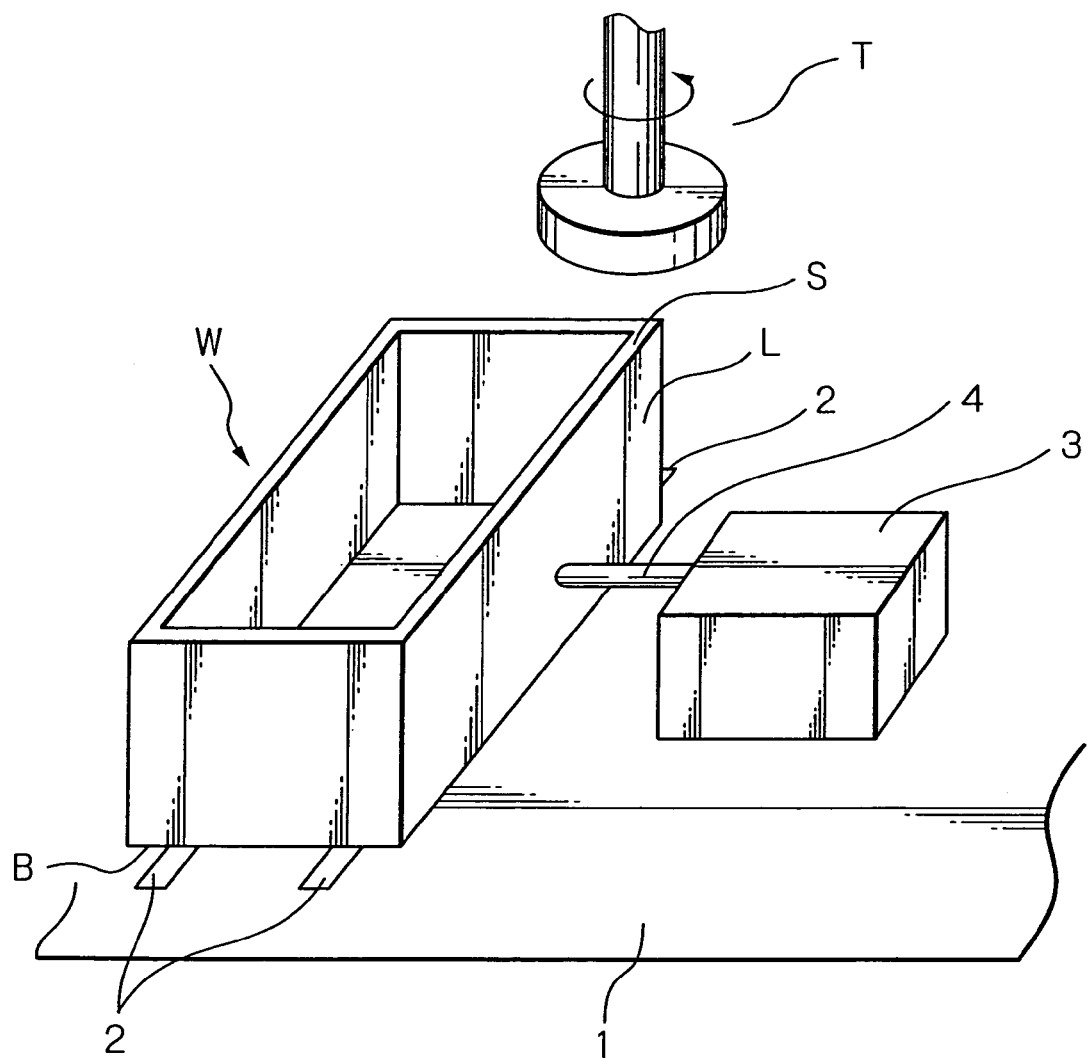
FIG. 1 is a schematic perspective view of an entire configuration of a conventional workpiece support device.
Figure 2:
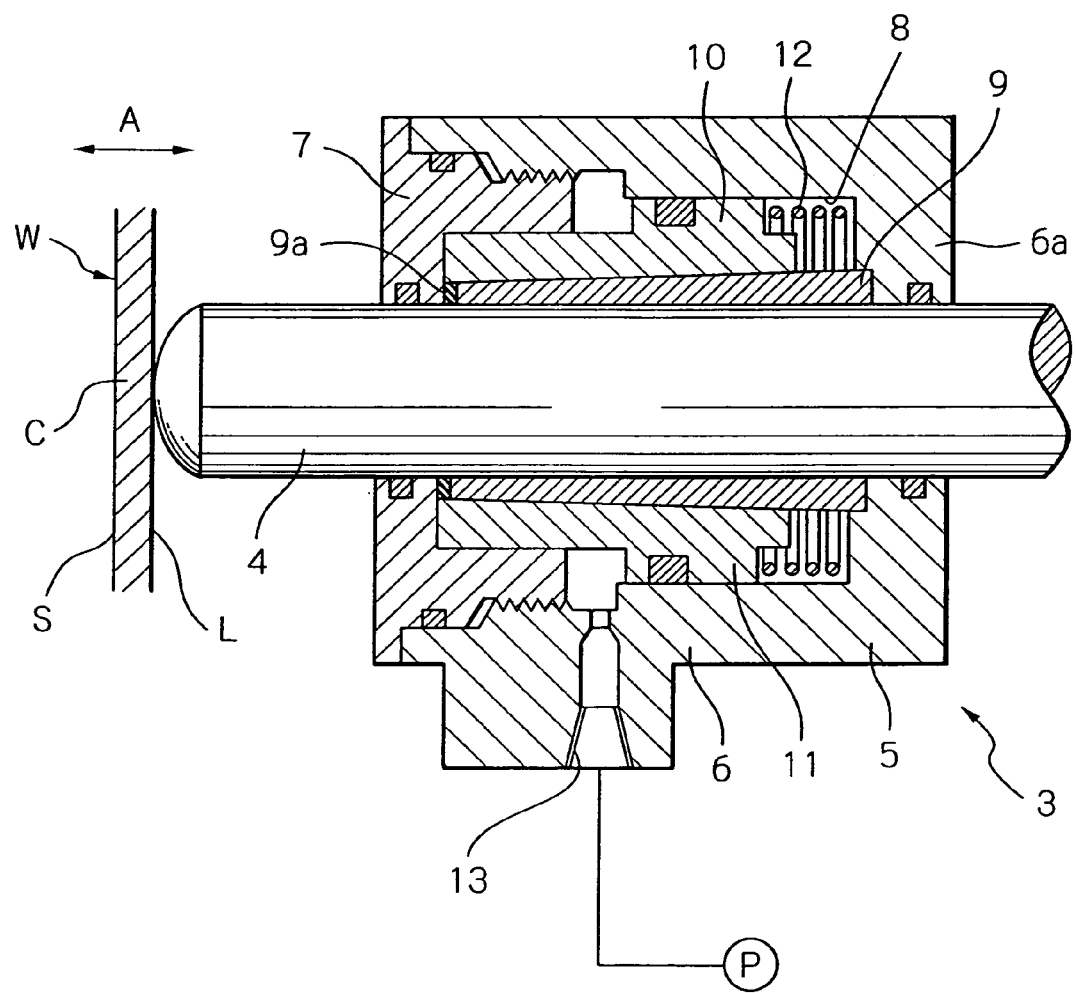
FIG. 2 is a sectional view of a support used in the device shown in FIG. 1.
Figure 3:
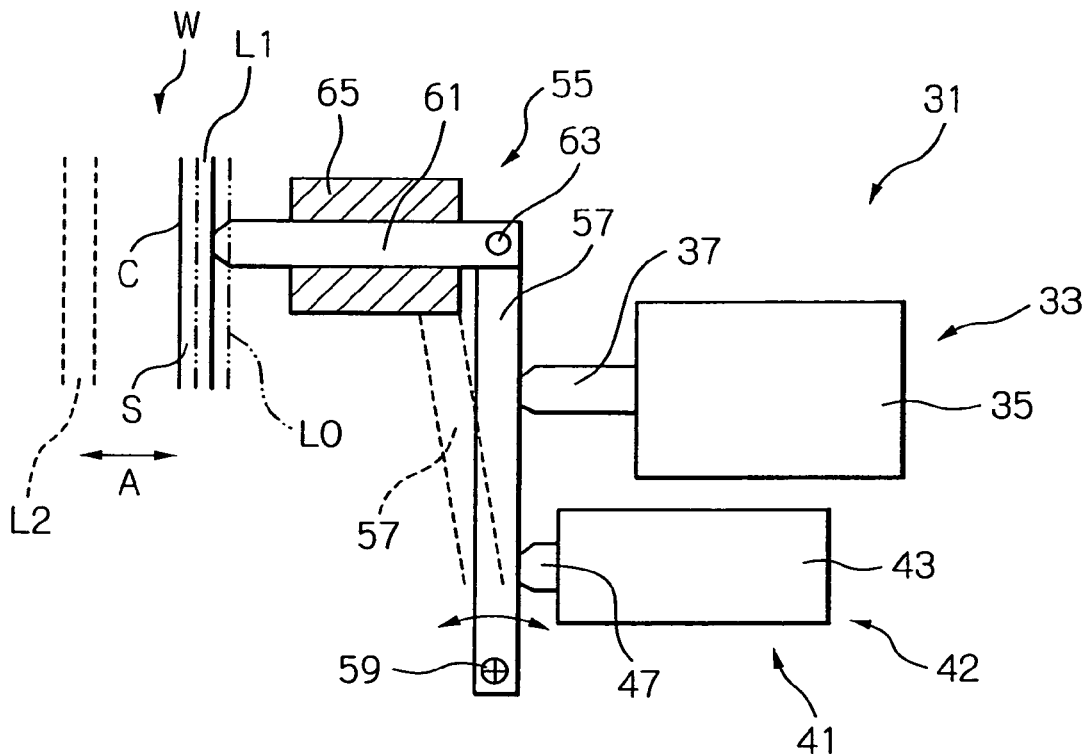
FIG. 3 is a schematic plan view showing use of a workpiece support device according to an embodiment of the invention.

FIG. 3 is a schematic plan view showing a case where a workpiece support device 31 according to an embodiment of the invention is used to grind an upper surface of one L of vertical walls of a thin box-shaped workpiece W by an unshown tool as described above with reference to FIGS. 1 and 2.

The workpiece support device 31 has two support units, and one of the units is a securing support unit 33. The securing support unit 33 is of a type essentially the same as a support used in the conventional method described above with reference to FIGS. 1 and 2. Specifically, the securing support unit 33 is of a type that a shaft 37 is protruded from a casing 35 by a desired length, and can be secured at a securing position. An example thereof is described with reference to FIG. 2, and thus detailed descriptions thereof will be omitted.

Reference numeral 41 is a following support unit, and a hydraulic cylinder device 42 is used in the embodiment. As the hydraulic cylinder device 42, a known device can be used, and no configuration specific to the invention is required.

Figure 4:
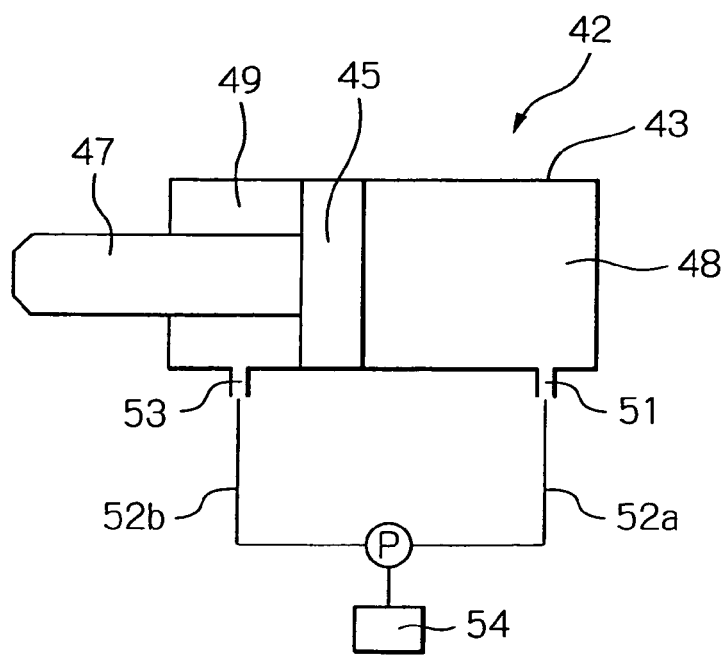
FIG. 4 is schematic sectional view of a hydraulic cylinder device used in a following support unit use in the device shown in FIG. 3.

As shown in FIG. 4, the hydraulic cylinder device 42 includes a cylinder 43, a piston 45 that is housed in the cylinder 43 in contact with an inner periphery of the cylinder 43 in a fluid-tight state, and is movable in an axial direction, and a rod 47 having one end secured to the piston 45 and the other end protruding outside the cylinder 43. Reference numerals 51 and 53 are ports communicating respectively with working chambers 48 and 49 defined on both sides of the piston 45 in the cylinder 43, and the ports are connected to a working fluid supply source P via lines 52a and 52b, respectively. The supply of a working fluid into the working chambers 48 and 49 is controlled by a control device 54. In the embodiment, as shown, the securing support unit 33 and the following support unit 41 are placed so that the shaft 37 and the rod 47 extend in parallel in the same direction.

Referring to FIG. 3 again, reference numeral 55 denotes an abutment unit. The abutment unit has an oscillation lever 57 mounted oscillably around a pivot 59, and a support pin 61 extending substantially orthogonally to the lever 57 is mounted to a free end of the lever 57 by means of a connecting pin 63. In the case where the connecting pin 63 is secured to the support pin 61, an elongated hole formed through the lever 57 and into which the connecting pin 63 is inserted is vertically oriented in an axial direction so that the support pin 61 is linearly movable relative to the lever 57 without any trouble when the lever 57 oscillates. Reference numeral 65 is a guide that guides the linear movement of the support pin 61.

Next, a method for supporting the workpiece W using the workpiece support device 31 will be described. The workpiece W is secured to a table of a machining tool by an unshown appropriate clamping device like the conventional example explained above. The support device 31 is also placed on and secured to the table of the machining tool in a predetermined positional relationship with the workpiece W. In this case, the securing support unit 33, the following support unit 41, and the abutment unit 55 may be previously placed in a predetermined positional relationship to form a unit, which is secured as it is, or may be separately placed and secured in a predetermined positional relationship.

The workpiece W is secured by a clamp so as to be positioned at LO shown by a double-dot line in FIG. 3. For the workpiece W placed in this position, a hydraulic pressure is first supplied to the hydraulic cylinder device 42 of the following support unit 41, and the rod 47 is moved to the left in FIG. 3 by a predetermined distance to cause the tip of the rod 47 to abut against the oscillation lever 57. At this time, the oscillation lever 57 is pressed by a preset pressure to displace a portion near a portion C to be machined on the vertical wall L of the workpiece W to a position L1 shown by a solid line in FIG. 3. Specifically, a slight preload is applied to the portion to cause slight elastic deformation. Then, the hydraulic cylinder device 42 is controlled by the control device so as to keep the preload applied.

Then, the shaft 37 of the securing support unit 33 is moved as described in the conventional example, and secured at a position where the tip of the shaft 37 abuts against the oscillation lever 57. The shaft 37 is thus secured to prevent the oscillation lever 57 and thus the portion to be machined of the workpiece W from moving to the right of the position L1 shown by the solid line in FIG. 3. The preload is thus previously applied to cause slight elastic deformation of the workpiece, thereby increasing resistance to a force applied during machining and thus restraining chatter during machining.

Preparation is thus finished, and machining is started in this state. When the upper surface S of the vertical wall L is machined, the portion near the portion C being machined of the workpiece W reciprocates between the position L1 shown by the solid line in FIG. 3 and a position L2 shown by a broken line. At this time, when the portion C being machined of the workpiece W moves, the movement is detected via the support pin 61, and the control device controls a fluid pressure in the working chambers 48 and 49 to move the piston 45. In this manner, the support pin 61 moves following the action of the piston following support unit 41, and also keeps in contact with the portion C being machined with a predetermined contact pressure. The support pin 61 thus keeps in contact with the portion C being machined of the workpiece W during machining to restrain higher order chatter vibrations of small amplitude. When the portion C being machined is displaced to the left of the position L1, the shaft 37 of the securing support unit 33 is separated from the oscillation lever 57, but the secured shaft 37 prevents the portion C being machined and the oscillation lever 57 from moving to the right of the position shown by the solid line.

Figure 5:
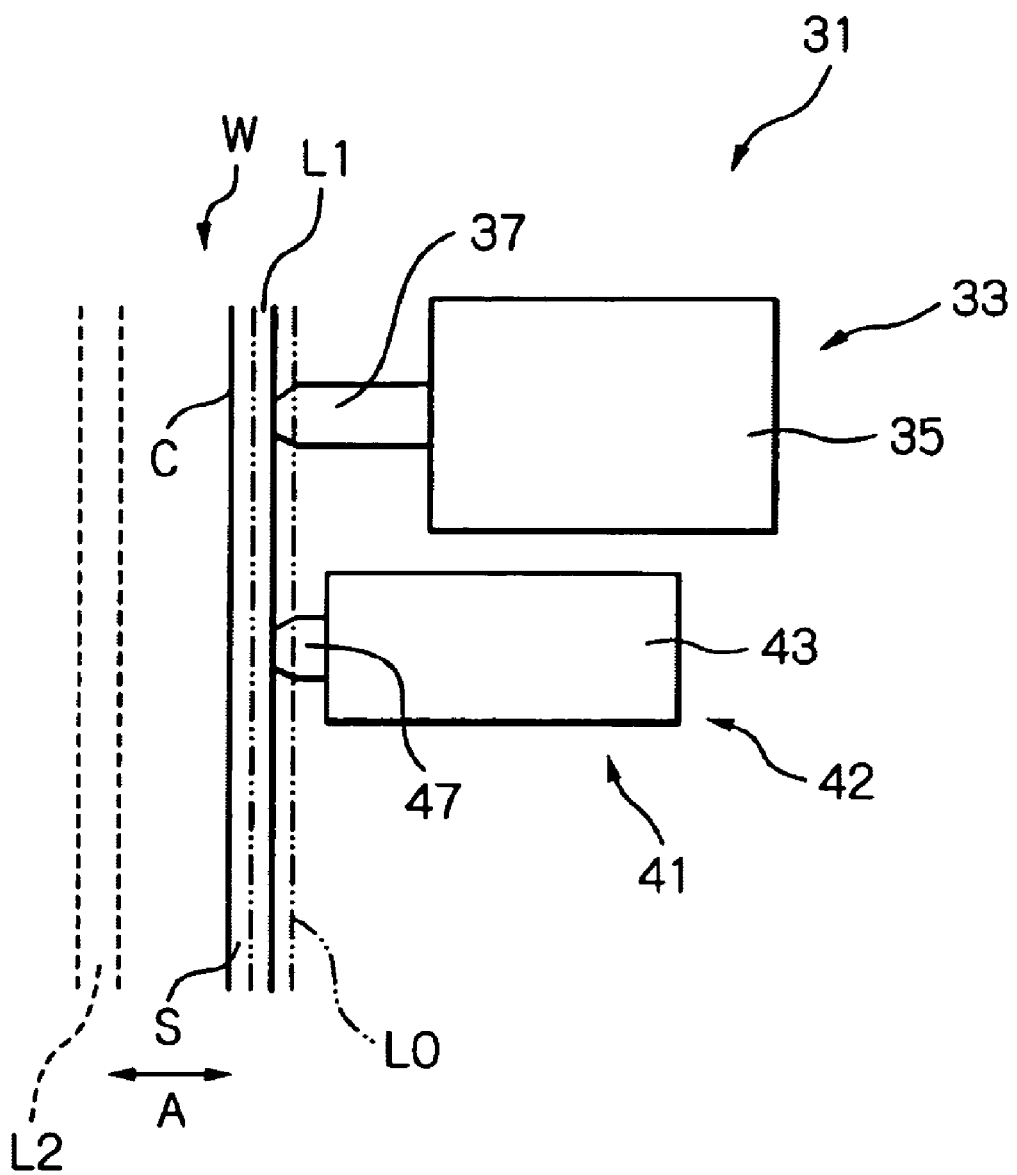
FIG. 5 is a schematic sectional view comparable to FIG. 3 showing an alternate embodiment of the invention.

As described above, in the invention, the securing support unit and the following support unit are provided, the following support unit applies the preload to the workpiece at the portion near the portion to be machined to cause the slight elastic deformation, and the securing support unit prevents the workpiece from recovering from the elastic deformation. This can previously increase resistance to chatter vibrations caused during machining. Further, while the portion being machined of the workpiece moves away from the securing support unit, the abutment member of the following unit keeps in contact with the workpiece at the portion near the portion being machined with the contact pressure directly (FIG. 5) or indirectly via the support pin of the abutment unit (FIG. 3), thereby restraining small chatter vibrations. This allows machining without reducing a machining speed, with high working efficiency, and with high accuracy.

The invention is particularly suitable for machining a workpiece that has a complicated shape and cannot be clamped at a portion near a portion to be machined. In this case, a sufficient advantage can be obtained not only for a thin workpiece but also for a sufficiently thick workpiece. Specifically, even for the thick workpiece, chatter vibrations are likely to occur as a machining speed increases, and the chatter vibrations can be sufficiently restrained by using the method and the device according to the invention. This allows machining at a higher machining speed than conventional.

What is claimed is:

1. A workpiece support device for use in machining a workpiece comprising:
   a securing support unit;
   a following support unit separate and spaced apart from said securing support unit; and
   an abutment unit;
   wherein said securing support unit has a securing abutment member releasably positioned and secured in a desired position, said securing abutment member operatively engaging said workpiece at a portion near a portion to be machined to prevent said portion to be machined from moving against said secured securing abutment member,
   said following support unit has a following abutment member separate and spaced apart from said securing abutment member which is adapted to operatively engage said workpiece at a portion near said portion to be machined on the same side as said securing abutment member, and be movable following a movement of said portion to be machined of said workpiece and wherein said following abutment member moves cooperatively, but independently of said securing abutment member, and
   wherein said abutment unit has a support pin that operatively engages said workpiece at the portion near said portion to be machined, said securing abutment member and said following abutment member operatively engaging said workpiece via said abutment unit, and wherein said abutment unit includes an oscillation lever oscillably supported at one end, said support pin is provided at the other end of said oscillation lever, and said securing abutment member and said following abutment member abut against said oscillation lever at separate points spaced from one another.

2. The workpiece support device according to claim 1, wherein said following support unit is a cylinder device including a cylinder and a rod extendable from said cylinder, said following abutment member includes said rod, and a control device controls a pressure of a working fluid in said cylinder of said cylinder device.

3. The workpiece support device according to claim 2, wherein said control device controls the pressure of the working fluid in said cylinder so as to urge said rod in an extending direction from said cylinder at a constant pressure.

4. The workpiece support device according to claim 3, wherein said cylinder device is a hydraulic cylinder device.

5. The workpiece support device according to claim 1, wherein said following support unit is a cylinder device including a cylinder and a rod extendable from said cylinder, said following abutment member includes said rod, and a control device controls a pressure of a working fluid in said cylinder of said cylinder device.

6. The workpiece support device according to claim 5, wherein said control device controls the pressure of the working fluid in said cylinder so as to urge said rod in an extending direction from said cylinder at a constant pressure.

7. The workpiece support device according to claim 6, wherein said cylinder device is a hydraulic cylinder device.

8. The workpiece support device according to claim 1, wherein said following support unit is a cylinder device including a cylinder and a rod extendable from said cylinder, said following abutment member includes said rod, and a control device controls a pressure of a working fluid in said cylinder of said cylinder device.

9. The workpiece support device according to claim 8, wherein said control device controls the pressure of the working fluid in said cylinder so as to urge said rod in an extending direction from said cylinder at a constant pressure.

10. The workpiece support device according to claim 9, wherein said cylinder device is a hydraulic cylinder device.

11. A workpiece support method for restraining chatter vibrations of a workpiece in machining the workpiece, comprising the steps of:

causing a following abutment member to operatively engage, with a predetermined preload, against the workpiece at a portion near a portion to be machined on one side in vibration directions of chatter vibrations that occur in the workpiece with a predetermined preload;

causing a securing abutment member which is separate and spaced apart from said following abutment member to operatively engage said workpiece at a portion near said portion to be machined on the same side as said following abutment member, and releasably securing said securing abutment member at a securing position; and moving said following abutment member cooperatively, but independently of said securing abutment member, so as to follow a movement of said portion to be machined of the workpiece during machining the workpiece, and keeping said following abutment member in operative engagement with said workpiece at the portion near said portion to be machined during machining the workpiece, and wherein said following abutment member operatively engages said workpiece with a pressure higher than a predetermined pressure while moving following the movement of said portion to be machined, and wherein said securing abutment member and said following abutment member abut against an oscillation lever at separate points spaced from one another, and wherein said oscillation lever is oscillably supported at one end and having at the other end a support pin that abuts against said workpiece at a portion near said portion to be machined, and said oscillation lever oscillates during machining the workpiece to keep said support pin in contact with said workpiece at the portion near the portion to be machined.

12. A workpiece support method for restraining chatter vibrations of a workpiece in machining the workpiece, comprising the steps of:

causing a following abutment member to operatively engage, with a predetermined preload, against the workpiece at a portion near a portion to be machined on one side in vibration directions of chatter vibrations that occur in the workpiece with a predetermined preload;

causing a securing abutment member which is separate and spaced apart from said following abutment member to operatively engage said workpiece at a portion near said portion to be machined on the same side as said following abutment member, and releasably securing said securing abutment member at a securing position; and moving said following abutment member cooperatively, but independently of said securing abutment member, so as to follow a movement of said portion to be machined of the workpiece during machining the workpiece, and keeping said following abutment member in operative engagement with said workpiece at the portion near said portion to be machined during machining the workpiece, and wherein said securing abutment member and said following abutment member abut against an oscillation lever oscillably supported at one end and having at the other end a support pin that abuts against said workpiece at a portion near said portion to be machined, and said oscillation lever oscillates during machining the workpiece to keep said support pin in contact with said workpiece at the portion near the portion to be machined.

13. A workpiece support. device for use in machining a workpiece comprising:

a securing support unit; and
a following support unit, wherein said securing support unit has a securing abutment member releasably positioned and secured in a desired position, said securing abutment member abutting against said workpiece at a portion near a portion to be machined to prevent said portion to be machined from moving against said secured securing abutment member, and said following support unit has a following abutment member adapted to abut against said workpiece at a portion near said portion to be machined on the same side as said securing abutment member, and be movable following a movement of said portion to be machined of said workpiece.

14. A workpiece support method for restraining chatter vibrations of a workpiece in machining the workpiece, comprising the steps of:

causing a following abutment member to abut with a predetermined preload, against the workpiece at a portion near a portion to be machined on one side in vibration directions of chatter vibrations that occur in the workpiece with a predetermined preload;

causing a securing abutment member to abut against said workpiece at a portion near said portion to be machined on the same side as said following abutment member, and releasably securing said securing abutment member at a securing position; and moving said following abutment member so as to follow a movement of said portion to be machined of the workpiece during machining the workpiece, and keeping said following abutment member in contact with said workpiece at the portion near said portion to be machined during machining the workpiece.

15. The workpiece support device according to claim 13, wherein said following abutment member is adapted to operatively engage said workpiece at a portion near said portion to be machined on the same side as said securing abutment member but spaced therefrom.

16. The workpiece support device according to claim 13, wherein said following support unit is a cylinder device including a cylinder and a rod extendable from said cylinder, said following abutment member includes said rod, and a control device controls a pressure of a working fluid in said cylinder of said cylinder device.

17. The workpiece support device according to claim 16, wherein said control device controls the pressure of the working fluid in said cylinder so as to urge said rod in an extending direction from said cylinder at a constant pressure.

18. The workpiece support device according to claim 17, wherein said cylinder device is a hydraulic cylinder device.

19. The workpiece support device according to claim 13, wherein said following support unit is a cylinder device including a cylinder and a rod extendable from said cylinder, said following abutment member includes said rod, and a control device controls a pressure of a working fluid in said cylinder of said cylinder device.

20. The workpiece support device according to claim 19, wherein said control device controls the pressure of the working fluid in said cylinder so as to urge said rod in an extending direction from said cylinder at a constant pressure.

21. The workpiece support. device according to claim 20, wherein said cylinder device is a hydraulic cylinder device.

22. The workpiece support device according to claim 13, wherein said following support unit is a cylinder device including a cylinder and a rod extendable from said cylinder, said following abutment member includes said rod, and a control device controls a pressure of a working fluid in said cylinder of said cylinder device.

23. The workpiece support device according to claim 22, wherein said control device controls the pressure of the working fluid in said cylinder so as to urge said rod in an extending direction from said cylinder at a constant pressure.

24. The workpiece support device according to claim 23, wherein said cylinder device is a hydraulic cylinder device.

25. The workpiece support method according to claim 14, wherein during said step of moving said following abutment member, said following abutment member is adapted to operatively engage said workpiece at a portion near said portion to be machined on the same side as said securing abutment member but spaced therefrom.

26. The workpiece support method according to claim 14, wherein said following abutment member abuts against said workpiece with a pressure higher than a predetermined pressure while moving following the movement of said portion to be machined.

* * * * *